United States Patent [19]

Irvin

[11] Patent Number: 5,134,006
[45] Date of Patent: Jul. 28, 1992

[54] BELT REINFORCING FABRIC AND A BELT REINFORCED WITH THE SAME

[75] Inventor: Cynthia A. Irvin, Columbus, Ohio

[73] Assignee: The Goodyear Tire & Rubber Company, Akron, Ohio

[21] Appl. No.: 803,267

[22] Filed: Dec. 5, 1991

[51] Int. Cl.$^5$ .............................................. B32B 1/04
[52] U.S. Cl. ..................................... 428/68; 198/847; 428/250; 428/257; 428/193; 474/264
[58] Field of Search ................... 198/847; 474/264; 428/68, 250, 257, 193

[56] References Cited

U.S. PATENT DOCUMENTS

| | | | |
|---|---|---|---|
| 3,593,840 | 7/1971 | Guyer | 198/193 |
| 3,973,670 | 8/1976 | Spaar | 198/193 |
| 4,296,855 | 10/1981 | Blalock | 198/502 |
| 4,816,028 | 3/1989 | Hapadia et al. | 428/257 |

*Primary Examiner*—James J. Bell
*Attorney, Agent, or Firm*—Dion, Sr. Marc R.

[57] ABSTRACT

A belt reinforcing fabric is provided with leno woven fray stop yarns in the warp direction which are laterally spaced and serve to prevent the warp yarns from fraying out of the side of the belt.

4 Claims, 1 Drawing Sheet

BELT REINFORCING FABRIC AND A BELT REINFORCED WITH THE SAME

FIELD OF THE INVENTION

This invention relates to a belt reinforcing fabric which is particularly constructed to prevent fraying.

BACKGROUND OF THE INVENTION

Power transmission belts, document transport belts and conveyor belts are generally constructed with a pulley cover, a top cover, and one or more layers of fabric reinforcement between the covers. Generally, the fabric is square woven with longitudinal warp and lateral weft yarns. In conveyor belt systems in particular, where the belts may extend to several thousand yards in length, the inability of the support system to properly track the belt can cause the edge of the belt to be abraded by its contact with the belt support structure. Damage to these edges causes the warp yarns to fray out of the belt.

SUMMARY OF THE INVENTION

In accordance with the practice of the present invention, there is provided a belt reinforcing fabric comprising longitudinal warp yarns, lateral weft yarns, and a plurality of fray stop yarns woven in the leno weave fashion about said weft yarns and laterally spaced between a predetermined number of warp yarns. There is also disclosed a belt having at least one of a pulley cover or a top cover and at least one layer of a reinforcing fabric wherein the reinforcing fabric is constructed as described above. There is also provided a belt comprising a pulley cover, a top cover and a reinforcing fabric embedded therebetween wherein the reinforcing fabric is constructed as described above. In another embodiment there is disclosed a belt comprising at least two layers of reinforcing fabric with a layer of elastomer therebetween wherein at least one of the reinforcing fabric layers is constructed as described above.

DETAILED DESCRIPTION OF THE INVENTION

Figure 1:
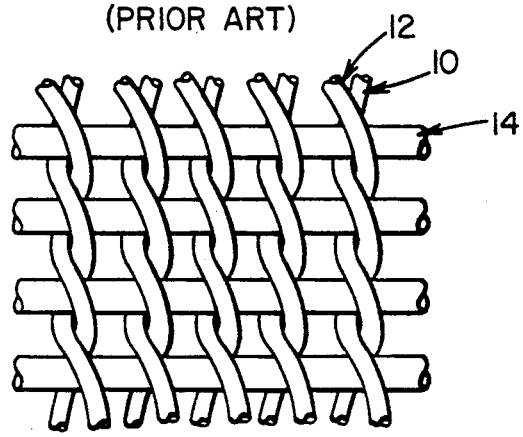
FIG. 1 is a prior art schematic illustration of a basic leno weave.
Figure 2:
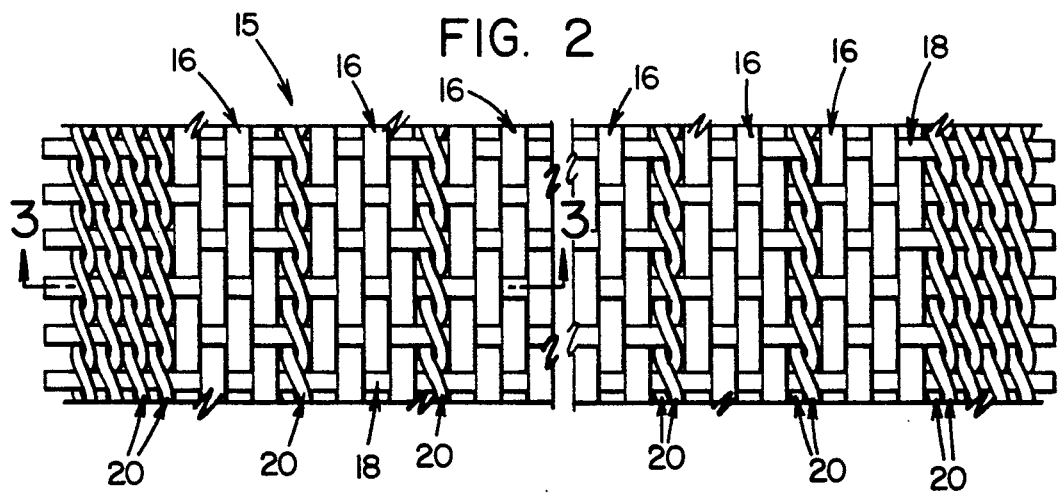
FIG. 2 is a schematic illustration of a plan view of the fabric of the instant invention.

FIG. 2 illustrates the belt reinforcing fabric (15) of the present invention. The fabric is comprised of longitudinal warp yarns (16), lateral weft yarns (18) interwoven with the warp yarns (16) and a plurality of fray stop yarns (20) which are woven in leno weave fashion about the weft yarns and laterally spaced between a predetermined number of warp yarns (16). The leno weave fashion is illustrated in FIG. 1. Lenoing is a weaving method used to cross and uncross two or more warp yarns (10) and 12) in an organized fashion about the weft yarns (14) thus locking the warp yarns (10, 12) to a position of the weft yarns (14). The leno fray stop yarns (20) may be the same size as the regular warp yarns (16) or the weft yarns (18) or they may be different sizes. One of the leno fray stop yarns may be one size and the other different or they may both be the same size. The leno fray stop yarns (20) used in the fabric can be of the same material as the yarn of the basic fabric or it could be different. A given fabric may have two or more different leno yarns to provide the proper locking effect. A basic leno weave requires pairs of warp yarns where the yarns of each yarn in the pair twist with one another. The leno yarns can be twisted about each weft yarn or alternating weft yarns or about a plurality of weft yarns. More than one pair of leno yarns may be adjacent to each other with either the same twist pattern or different twist patterns. The paired yarns may be of a different fiber, twist, and/or color. One example would be the use of a lighter weight yarn lenoing with a yarn in the fabric body to hold the body's warp yarn in its intended position. The leno weave includes but is not confined to basic leno as shown in FIG. 1 where pairs of yarns are twisted, but also other variations of a leno may also be used where more than two yarns are twisted together such as one yarn being lenoed with two or two with two.

The body of the fabric may be any suitable material, its weave, construction and yarn constituents varying according to the end use application. The leno fray stop yarns can be used either near the edges of the fabric body or across the entire width either at uniform lateral spacing or at varying lateral spacing.

The number of leno fray stop yarns (20) and the lateral spacing between them is a matter of design choice depending on the end use application.

Figure 3:
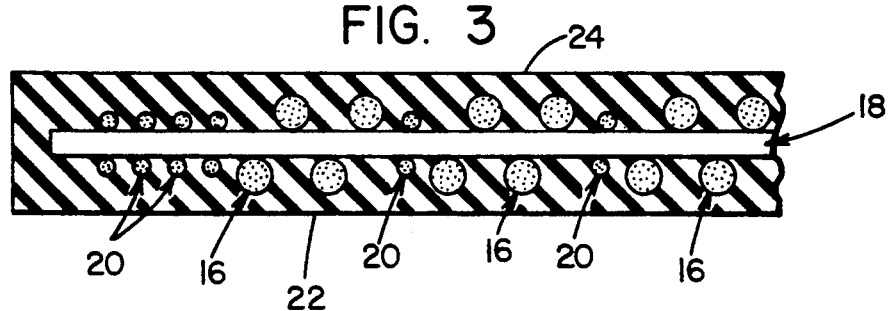
FIG. 3 is a cross sectional view of a conveyor belt utilizing a reinforcing fabric according to the present invention.

The more conventional belt of the instant invention as illustrated in FIG. 3 has a pulley cover (22) and a top cover (24) and a belt reinforcing fabric 15) therebetween. The covers can be made out any suitable elastomeric material as is well known in the art. The belt reinforcing fabric (15) is as described above in referenced to FIG. 2. Alternative embodiments to the more conventional belt are those where only one of the covers is present in combination with the reinforcing fabric of the present invention. Also contemplated is a belt having at least two layers of fabric reinforcement with a layer of elastomer therebetween wherein at least one but preferably all layers of the fabric reinforcement is the fabric of the present invention. The fabric of the present invention can be made on any number of suitable weaving machines. It is preferred that the fabric be treated with a suitable adhesive dip such as the well known RFL system in order to improve the adhesion of the elastomer to the fabric.

The presence of the leno fray stop yarns at laterally spaced intervals whether the distances set by actual measurement or are spaced by a certain number of the warp yarns, provides a number of barriers in the body of the fabric to either prevent or at least reduce the fraying of the regular warp yarns.

What is claimed is:

1. A belt reinforcing fabric comprising longitudinal warp yarns, lateral weft yarns and a plurality of fray stop yarns woven in leno weave fashion about said weft yarns and laterally spaced between a predetermined number of warp yarns.

2. A belt comprising at least one of a pulley cover or a top cover and a reinforcing fabric wherein said reinforcing fabric is comprised of longitudinal warp yarns, lateral weft yarns and a plurality of fray stop yarns woven in leno weave fashion about said weft yarns and laterally spaced between a predetermined number of warp yarns.

3. The belt according to claim 2 having both a pulley cover and a top cover.

4. A belt comprising at least two layers of fabric reinforcement and an elastomeric layer therebetween wherein at least one layer of the fabric reinforcement is comprised of longitudinal warp yarns, lateral weft yarns and a plurality of fray stop yarns woven in leno weave fashion about said weft yarns and laterally spaced between a predetermined number of warp yarns.

* * * * *